(12) United States Patent
Minagawa et al.

(10) Patent No.: US 7,402,809 B2
(45) Date of Patent: Jul. 22, 2008

(54) SCINTILLATOR MEMBER AND MANUFACTURING METHOD THEREOF, AND RADIATION MEASURING DEVICE

(75) Inventors: Eiichi Minagawa, Mitaka (JP); Shohei Matsubara, Mitaka (JP)

(73) Assignee: Aloka Co., Ltd., Tokyo (JP)

( * ) Notice: Subject to any disclaimer, the term of this patent is extended or adjusted under 35 U.S.C. 154(b) by 168 days.

(21) Appl. No.: 11/329,878

(22) Filed: Jan. 11, 2006

(65) Prior Publication Data
US 2006/0151706 A1 Jul. 13, 2006

(30) Foreign Application Priority Data
Jan. 13, 2005 (JP) ............................. 2005-005878
Nov. 4, 2005 (JP) ............................. 2005-321535

(51) Int. Cl.
*G01T 1/20* (2006.01)
(52) U.S. Cl. .................................. 250/368; 250/370.11
(58) Field of Classification Search ................. 250/368, 250/370.11
See application file for complete search history.

(56) References Cited

U.S. PATENT DOCUMENTS

| 4,720,426 | A * | 1/1988 | Englert et al. ................ 428/344 |
| 2004/0195514 | A1* | 10/2004 | Nagano .................. 250/370.11 |
| 2006/0249709 | A1* | 11/2006 | Nakamura ............ 252/301.4 F |
| 2007/0257198 | A1* | 11/2007 | Ogawa et al. ............ 250/370.11 |

FOREIGN PATENT DOCUMENTS

| EP | 0 250 983 | 1/1988 |
| JP | 62-16486 | 1/1987 |
| JP | 63-315990 | 12/1988 |
| JP | 3-231187 | 10/1991 |
| JP | 5-297145 | 11/1993 |
| JP | 7-35869 | 2/1995 |
| JP | 8-248139 | 9/1996 |
| JP | 2001-141831 | 5/2001 |
| JP | 2003-279654 | 10/2003 |
| WO | WO 00/77545 | 12/2000 |

* cited by examiner

*Primary Examiner*—David P. Porta
*Assistant Examiner*—Mindy Vu
(74) *Attorney, Agent, or Firm*—William L. Androlia; H. Henry Koda (57) ABSTRACT

When a heating process is performed in a state where a thermal transfer sheet is superimposed on a scintillator plate, a film of the thermal transfer sheet is separated from the thermal transfer sheet and adhered onto the scintillator plate. The film includes a protective layer, an aluminum layer, and an adhesive layer. The aluminum layer is protected by the protective layer. Because the scintillator plate by itself functions as a rear surface support substrate with respect to the protective layer and the aluminum layer, a film which is highly resistive against an external effect can be formed. A plurality of films can be layered on the scintillator plate. A pressure transfer method can also be used for formation of the film. A scintillator member in which the film has been formed is disposed in a radiation measuring device.

15 Claims, 6 Drawing Sheets

SCINTILLATOR MEMBER AND MANUFACTURING METHOD THEREOF, AND RADIATION MEASURING DEVICE

BACKGROUND OF THE INVENTION

1. Field of the Invention

The present invention relates to a scintillator member (scintillator assembly or scintillator construction) and to a manufacturing method thereof, and a radiation measuring device, and more particularly to light shielding technology of a scintillator member.

2. Description of Related Art

Scintillator members are used in various radiation measuring instruments including a surface contamination measuring instrument, a body surface monitor, and so on. When excited by radiation, a scintillator member emits light, which is then directed onto a light receiving surface of a photomultiplier tube (PMT). In order to detect the light generated in the scintillator with high sensitivity, a light shielding structure or a light tight structure (a dark room) for shielding the scintillator member from external light is provided on both rear and front surface sides of the scintillator member.

With regard to light shielding on the front surface (a radiation entering or incident surface) side of a scintillator member, attenuation of radiation passing through this surface should be considered. In particular, as the range of β rays in the air is small, a light tight film having a certain degree of thickness which is formed on the front surface side of a scintillator member would make blockage and attenuation of radiation on that surface non-negligible, thereby considerably lowering the measuring sensitivity. Thus, only a very thin light tight film can be provided on the front surface side of a scintillator member. Such a thin light tight film, however, has a very low physical strength and is also easy to corrode, when used on its own. Further, when the light tight film is scratched or has pinholes formed by scratching, light enters through such pinholes, making it impossible to detect weak light emission generated in the scintillator member.

In order to overcome the above problems, a technique of providing a plurality of thin light tight films such that they are spaced from each other on a front surface side a scintillator member may be considered, as described in Japanese Patent Laid-Open Publications Nos. 2001-141831 and Hei 3-231187. Each light tight film includes a resin layer and light tight layers formed on both sides of the resin layer. With this structure, even if a light tight layer formed on the top surface of a light tight film provided on the outermost side is damaged, light can be blocked by a light tight layer formed on the rear surface side. Further, when the entire light tight film provided on the outer side is damaged by a large external force, light shielding can be secured by an adjacent light tight film which is spaced from the damaged light tight film toward the inner side. Here, while a protective grille having a lattice shape may be provided on the front surface side of the outermost light tight film as required, there is a possibility that foreign matter or a contaminant may enter through any of the openings of the lattice. If the area of each opening of the protective grille is reduced to thereby enhance the physical protection, the sensitivity for radiation detection would be decreased.

When a light tight film is mounted onto a radiation measuring instrument, it is necessary to dispose the light tight film while pulling the whole film evenly so as to prevent wrinkles from being generated on the film. This task requires technical skill and takes an immense amount of time and labor. Further, the light tight film will easily tear when an excessive force is applied thereto during the disposing operation. Conventionally, these problems are very significant because, in general, a plurality of light tight films are mounted on a radiation measuring instrument.

Japanese Patent Laid-Open Publication No. Hei 7-35869 discloses one example radiation measuring instrument using a scintillator member. Japanese Patent Laid-Open Publication No. Hei 8-248139 describes that a light tight film is attached onto a thin scintillator plate having a large area (see paragraph 0041 and so on). Neither reference, however, describes details of the light tight film or a method of attaching the light tight film. In particular, while it is necessary to dispose an extremely thin light tight film in the case of β ray detection, a treating method specific to such a thin film is not disclosed in any of the references.

Japanese Utility Model Laid-Open Publication No. Sho 62-16486 describes that a light tight film is provided on a surface of a plastic scintillator. The light tight film includes a plastic film in a thin film shape and a deposition layer also in a thin film shape which is formed on a rear or top surface of the plastic film. This reference, however, does not describe how the light tight film in a thin film shape is provided on the plastic scintillator. Japanese Patent Laid-Open Publication No. Hei 5-297145 describes that a scintillator layer and a light tight layer are closely attached. However, the light tight layer is removable and is not fixedly adhered to the scintillator layer.

The present inventors have heretofore repeated various studies and experiments in order to form a thin light tight film having a thickness of approximately 1 to several μm on a surface of a scintillator plate. In an experiment using a vacuum deposition method, a scintillator plate was placed within a vacuum deposition vessel and aluminum was deposited on a surface of the scintillator plate which was being heated. It was found, however, that with this method, the thickness of the film became as much as approximately 20 μm and that when such a thick film was used as a light tight layer, the sensitivity of β ray was decreased considerably. It was also found that, with this method, control of the film thickness was very difficult. On the other hand, while a thin film having a light shielding effect could be formed by an experiment using a sputtering method, it was proved that the strength of the film was very weak and the film was stripped easily when it was rubbed. This method also poses problems that the number of scintillator plates which can be processed per single sputtering operation is limited and that it is difficult to process a large scintillator plate. In addition, while an ion plating method was also studied, with this method, the processing temperature exceeds 100° C., which causes a problem concerning heat resistance of some types of plastic scintillator materials which form the scintillator plate.

Each of the various methods described above requires a large device for forming a light tight film and is also unsuitable for mass processing, resulting in a problem of increased processing cost. In consideration of the background that it is very difficult to form a uniform thin film directly on a scintillator plate, it is currently common to provide a plurality of light tight films which are spaced from each other on a radiation entering surface side of the scintillator plate, as described in Japanese Patent Laid-Open Publication No. 2001-141831 described above. These light tight films, which are formed by applying aluminum deposition onto a very thin plastic film, tear very easily by themselves. Further, each light tight film, which is held in the air, has a very weak structure which is not resistant to an external force. There has therefore been a strong demand for a new light shielding technology in order to increase robustness of a radiation measuring device having a scintillator member.

SUMMARY OF THE INVENTION

The present invention advantageously provides a scintillator member including a film which is resistant to an external force and has an excellent light shielding effect.

Further, the present invention advantageously provides a method for manufacturing a scintillator member, in which a light tight film can be easily provided on a scintillator.

Still further, the present invention advantageously provides a radiation measuring device including a scintillator member which is resistant to an external force and has an excellent light shielding effect.

(1) In accordance with one aspect, the present invention provides a scintillator member comprising a scintillator which emits light when radiation enters the scintillator, and at least one film formed on a surface side of the scintillator which serves as a radiation entering surface side, wherein the film includes a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator and wherein the film is a strip film which has been transferred from a transfer sheet onto the surface of the scintillator.

With the above structure., at least one film is formed directly on the radiation entering surface (incident surface) of the scintillator (i.e. without an air layer being interposed therebetween), using a transfer technology. The film includes a protective layer, a light tight layer, and an adhesive layer. The light tight layer is preferably formed as a thin layer containing aluminum and transmits radiation entering from outside therethrough and blocks external light from entering. The light tight layer is formed to have a thickness which can minimize attenuation of radiation and which can also exhibit a light shielding effect. The protective layer is formed of a material which transmits radiation and simultaneously protects the light tight film against the external effects. The protective layer is generally formed as a coated layer, by coating or printing and then hardening to have a uniform thickness. The protective layer is formed to have a thickness which can minimize attenuation of radiation and can also exhibit a protection effect. It is desirable, however, to determine the thicknesses of the light tight layer and the protective layer in consideration of the number of films to be formed on the scintillator. Alternatively, it is desirable to determine the number of films to be formed on the scintillator in consideration of the thicknesses of the light tight layer and the protective layer in the film. The adhesive layer functions as a member which adheres the film onto the scintillator. It is desirable that any of the protective layer, the light tight layer, and the adhesive layer has a uniform thickness over the entire region. The film may include an intermediate layer which is provided between the protective layer and the light tight layer, another intermediate layer which is provided between the light tight layer and the adhesive layer, and other layers.

Because the scintillator functions as a rear surface support substrate with respect to the light tight layer, and also because the light tight layer is sandwiched between the protective layer and the scintillator, the light tight layer is effectively protected against the physical effects. For example, even when an external force is locally applied onto the film, the force is dispersed in the protective layer and also in the scintillator, so that the local force which would otherwise be applied onto the light tight layer can be prevented or reduced. Further, because the scintillator also functions as a rear surface support substrate with respect to the protective layer itself, the strength of the protective layer can be enhanced. Moreover, the use of an adhesive can eliminate the need for an elaborate and special device for attaching the film, which allows simple formation of films. Also, the use of the transfer technology in order to form the films makes it necessary only to transfer an aluminum deposition layer which has been already formed onto the scintillator, thereby eliminating the need to process the scintillator as a whole at a high temperature for a long period. In addition, because the light tight film which has been already formed to have a uniform thickness can be used as it is, the problem of uneven thickness can also be obviated. Here, while heat conduction to the scintillator occurs in a case where a thermal transfer method is adopted, even in such a case, processing can be performed at a relatively low temperature and also it is sufficient to heat only the thermal transfer portion for a short time period, as a result of which influences caused by heating can be substantially disregarded. Further, the use of a pressure transfer method can eliminate the problem resulting from heating.

By using the transfer method as described above, it is possible to separate a film, which has been formed as a thin film on a base film having a certain degree of thickness, from the base film and adhere the film onto the scintillator. As such, prior to the transfer, the film is integrated with the base film and is therefore in a stout state, and after the transfer, the film is then integrated with the scintillator and is also in a stout state. Further, because the film can be formed on the surface of the scintillator using a simple method of transfer, workability can be drastically increased compared to the conventional manual disposing method. Also, the protective layer having a uniform thickness can be formed by coating of a predetermined material onto the base film, and control of the thickness of such a protective film can be facilitated. It is also easy to form the light tight layer by deposition so as to have a uniform thickness on the protective layer which has been coated and cured.

Preferably, the light tight layer is a deposition layer containing aluminum. Preferably, the protective layer is a colored layer having a light shielding effect. Because the protective layer, which is a colored layer, has a light shielding effect by itself, the light shielding performance of the film as a whole can be further increased. Preferably, a plurality of films are layered on the surface side of the scintillator, and each film includes the protective layer, the light tight layer, and the adhesive layer. While the above film exerts its function in detection of an X ray, a Y ray, and an α ray, the film is particularly efficient for detection of a β ray which tends to attenuate very easily even in air. Preferably, a reflective material which reflects light entering from a rear surface side of the film is included in the adhesive layer. The reflective material preferably has a white color, and typically also has a diffused reflection effect.

(2) In accordance with another aspect, the present invention provides a radiation measuring device comprising a scintillator member, a container which encloses a rear surface side of the scintillator member, and a light detector for detecting light emitted from the rear surface side of the scintillator member, wherein the scintillator member includes a scintillator which emits light when radiation enters the scintillator, and at least one film formed on a surface side of the scintillator which serves as a radiation entering surface side, wherein the film includes a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator, and wherein the film is a strip film which has been transferred from a transfer sheet onto the surface of the scintillator.

Preferably, a reinforcing member having transparency is provided on a rear surface side of the scintillator member. Preferably, a plurality of films are layered on a top surface side of the scintillator member. Preferably, at least one separate light tight film is provided on the top surface side of the scintillator member in such a manner that the separate light tight film is spaced from the scintillator member. Preferably, the top surface side of the scintillator member is covered with a protective cover having a plurality of openings.

(3) In accordance with still another aspect, the present invention provides a method of manufacturing a scintillator member using a transfer sheet including a base layer and a film, comprising at least one transfer step of transferring the film from the transfer sheet onto a scintillator plate, wherein the transfer step includes a step of applying heat or pressure onto the transfer sheet while the transfer sheet is being superimposed on the scintillator plate to thereby separate the film from the transfer sheet and adhere the film onto the scintillator plate, and wherein the film includes a light tight layer which transmits radiation therethrough and also prevents transmission of light.

With the above structure, it is possible to form a film having a light tight layer on a scintillator plate by using a simple method of transfer, thereby allowing reduction in manufacturing cost. Further, prior to the transfer, the film is integrated with a base layer and is therefore placed in a stout state, and after the thermal transfer, the film is integrated with the scintillator plate and is therefore placed in a stout state. Here, it is also possible to adopt a transfer method other than the thermal transfer method (such as a pressure transfer method). With the thermal transfer method, it is possible to transfer a thin film onto the scintillator simply and reliably, as described above.

Preferably, the transfer step is performed at least twice, for layering a plurality of films on the scintillator plate. With this structure, the light shielding ability, as well as physical strength, can be enhanced. Preferably, the transfer step includes a step of cleaning a surface of the scintillator plate prior to adhering of the film onto the scintillator plate. For example, the transfer step is performed within a clean air space, or clean air is sprayed onto a surface of the scintillator plate. Preferably, during the transfer step, a support plate is provided on the rear surface side of the scintillator plate. The support plate exhibits an effect of removing heat from the scintillator plate during the thermal transfer process, thereby preventing or reducing a problem of curving of the scintillator plate after the thermal transfer. The support plate is preferably a metal flat plate.

BRIEF DESCRIPTION OF THE DRAWINGS

Preferred embodiments of the present invention will be described in detail based on the following figures, wherein.

DETAILED DESCRIPTION OF PREFERRED EMBODIMENTS

Preferred embodiments of the present invention will be described in detail with reference to the accompanying drawings.

Figure 1:
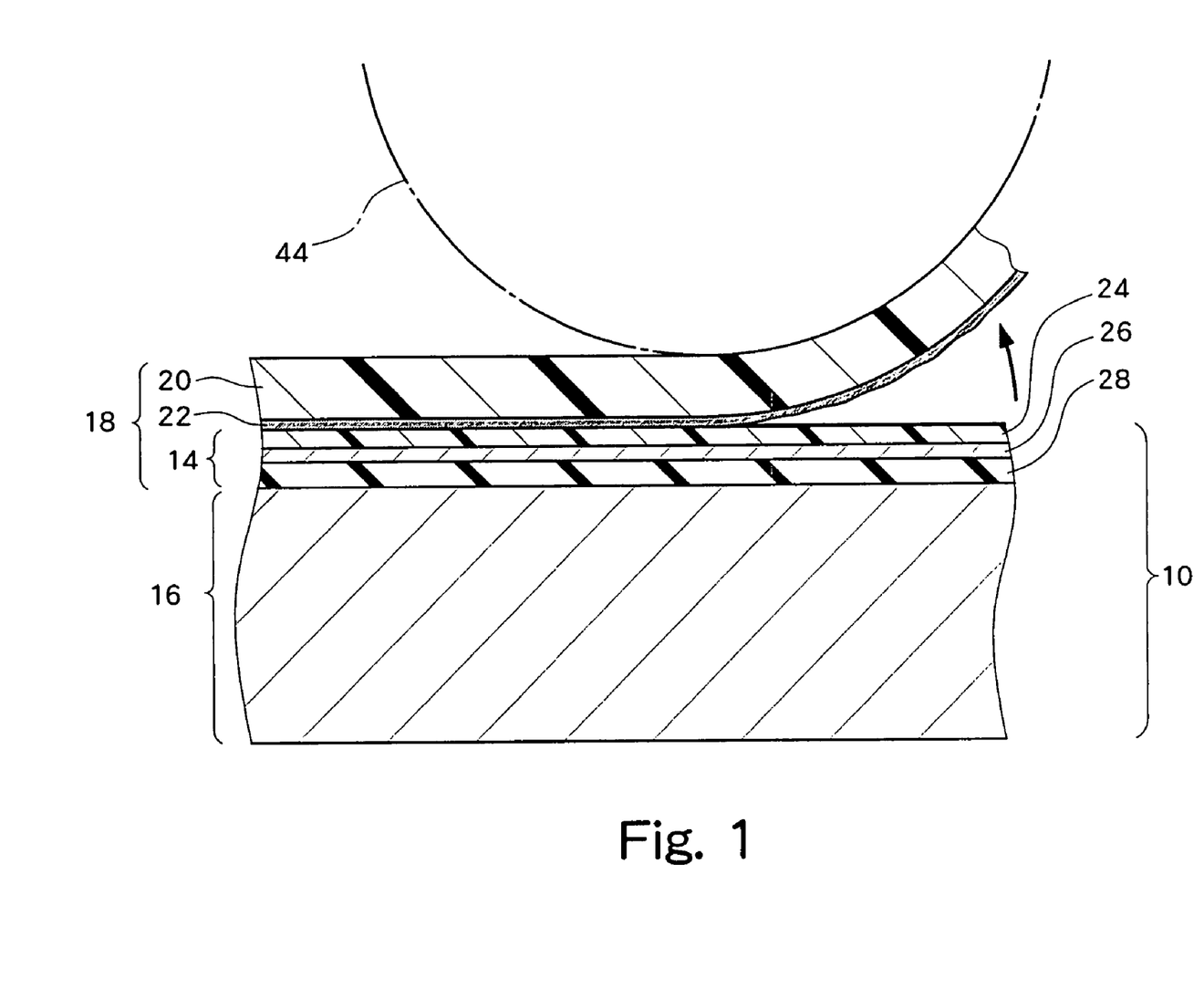
FIG. 1 is a conceptual view showing a manufacturing method of a scintillator member according to the present invention.

FIG. 1 shows a manufacturing method of a scintillator member (scintillator assembly or scintillator construction) 10 according to an embodiment of the present invention. The scintillator member 10 is used as a radiation detector in a radiation measuring device. The scintillator member 10 is composed of a scintillator plate 16 and a thin film 14.

While a scintillator member including one film which is formed on a surface. (a radiation entering surface) of the scintillator plate 16 is shown in FIG. 1, a plurality of films 14 may be layered on the surface of the scintillator plate 16.

The scintillator plate 16 is formed of a plastic scintillator material. As is known, the scintillator plate 16, when hit by radiation, emits light, and the emitted light is then detected on a rear surface side of the scintillator plate 16. The radiation may include an X ray (a Y ray), a β ray, and an α ray, for example, and the scintillator member 10 according to the present embodiment is particularly preferable for detection of β ray. The scintillator member 10 is shown as a plate member in FIG. 1, and the scintillator member 10 forms a so-called large-area scintillator detector. However, the shape of the scintillator member 10 is not limited to a flat plate, and may also be a curved surface or of a rod shape. With the use of the transfer technology, a light tight layer can be formed easily with respect to a scintillator having any shape.

The film 14 is provided with both the function of transmitting radiation and the function of blocking the external light. According to the present embodiment, the film 14 is a strip film which has been separated from a thermal transfer sheet 18 by means of a thermal transfer method, as will be described in detail below. The film 14, as viewed from the radiation entering side, includes a protective layer 24, an aluminum layer 26 serving as a light tight layer, and an adhesive layer in this order. Each of these layers has a uniform thickness over the entire region.

The protective layer 24 is formed of a transparent material or a colored material, and covers the entire surface of the aluminum layer 26 to exert a function of protecting the aluminum layer 26 against physical effects. The protective layer 24 is formed by an acryl epoxy material, for example, and has a thickness which is set within the range between 0.5 and 3 μm. Preferably, the protective layer 24 has a thickness of 1.0 μm. The protective layer 24 is formed by a rigid material into a uniform thin layer, and thus protects the aluminum layer 26 against physical effects, as described above. The protective layer 24, when formed as a colored layer, such as a black layer or a white layer, for example, can be provided with a light shielding function by itself. Because resin materials have less influence for attenuation of radiation than the aluminum material which forms the aluminum layer 26, it is desirable to form the protective layer 24 to have a greater thickness than the aluminum layer 26.

The protective layer 24 is a coated film (or an applied film) formed by coating and hardening a predetermined material on a base film which will be described below. Such a coating process is advantageous in that a uniform thin film can be formed comparatively easily.

In the present embodiment, prior to the thermal transfer, the film 14 is integrated with the base film 20 which will be described below, to thereby secure the strength of the film 14, and after the thermal transfer, the film 14 is then integrated with the scintillator plate 16, to thereby secure the strength of the film 14. As the film 14 need not exist solely in this manner, handling of the film 14 is very easy.

The aluminum layer 26 is formed of an aluminum material or a composite material including an aluminum material, and is formed, as a deposit layer, on a rear surface side of the protective layer 24. Specifically, the aluminum layer 26 is formed by deposition during formation of the heat transfer sheet 18, and has a thickness which is set within a range between 0.01 and 1.5 μm, preferably 0.05 μm. The aluminum layer 26 may alternatively be formed during formation of the thermal transfer sheet 18 by any method other than the deposition method. The aluminum layer 26 is provided with a light shielding function for transmitting radiation, which is a target of measurement, and simultaneously preventing external light from reaching the scintillator plate and a reflection function for reflecting light entering from the scintillator side. Here, it is also possible to form the deposition layer using a material other than an aluminum material.

In the present embodiment, the adhesive layer 28 is formed of a thermoplastic adhesive material, such as an olefin material (e.g. a PP adhesive material, an acrylic adhesive material, and so on). The adhesive layer 28 serves to adhere the film 14 onto the scintillator plate 16, and has a thickness of approximately 2 to 3 μm. While it is desirable to use a material which is cured by heating as a material for forming , the adhesive layer 28, various other adhesive materials can be used. However, because attenuation of radiation cannot be disregarded if the adhesive layer 28 is too thick, it is desirable to form the adhesive layer 28 so as to have a minimum thickness in consideration of such attenuation of radiation. A plurality of adhesive layers can also be formed. In the present embodiment, titanium oxide powders having a white color are added in the adhesive layer 28. The powders serve as a reflective material which causes reflection (diffused reflection) of light entering from the scintillator plate 16 side. Here, materials other than titanium oxide may be used.

The scintillator plate 16 has a thickness of 0.5 to 2.0 mm, for example, and the thickness is appropriately set in accordance with the type of radiation to be detected, and so on. For example, it is possible to form the scintillator member 10 by the thin scintillator plate 16 and the film 14 and curve the scintillator member for use as a radiation detector. The film 14 may be formed by thermal transfer in a state where the scintillator plate 16 is curved. While the scintillator plate 16 is normally transparent by itself, extremely fine uneven portions which cause light scattering are formed on a surface of the scintillator plate 16, as required, so as to increase the light emission portion as viewed from the light detector side.

The transfer sheet 18 will be described in detail. The transfer sheet 18 includes a base film 20 and the above-described film 14, with a release layer 22 being interposed between the base film 20 and the film 14. During the thermal transfer, when the transfer sheet 18 is heated, the film 14 will be separated from the base film 20 due to the effect of the release layer 22 which is formed of a release agent. Simultaneously, the film 14 is adhered onto the scintillator plate 16 due to the effect of the adhesive layer 28 described above. The base film 20 is formed of a polyester resin, for example, and is more specifically formed of a polyethylene terephthalate (PET) film. The thickness of the base film 20 is set within a range between 10 to 22 μm, preferably to 16 μm. The release layer 22 is formed of a wax or acryl material, and has a thickness which is set within a range between 0.3 to 0.8 μm, and preferably to 0.5 μm. A thermal transfer sheet including no such release layer can also be used.

FIG. 1 shows a state where the thermal transfer sheet 18 is superimposed on the scintillator plate 16 and the resulting composite member is being transported. After the composite member is locally heated using a thermal transfer roller which is not shown, a guidance roller 44 rolls up the base film 20. Consequently, the film 14 is separated from the base film 20 as described above and remains on the scintillator member 10 side. As such, the thermal transfer process is completed.

As will be described below, as heat conduction to the scintillator plate 16 is performed locally during the thermal transfer process, a problem of deterioration of the scintillator plate 16 due to the thermal effects rarely arises. However, in order to prevent curving of the scintillator member 10 after the thermal transfer, a thin flat metal plate may be provided on the rear surface side of the scintillator plate 16 (i.e. between the scintillator plate 16 and a belt conveyer which will be described below). Such a metal plate is formed of aluminum, for example, and exerts a heat absorption effect for removing the heat applied to the scintillator plate 16 from the rear surface of the scintillator plate 16.

It should be noted that each of the numeral values described above shows only an example, and various values can be adopted depending on the various conditions. For example, it is possible to minimize the thickness of the aluminum layer 26 as long as the light shielding function thereof is sufficiently secured and to simultaneously increase the thickness of the protective layer 24. Further, it is also possible to form the film 14 by a thin aluminum layer 26 and a thin protective layer 24 and layer a plurality of such films 14, thereby forming a thick aluminum layer and a thick protective layer as a whole. In any case, it is desirable to appropriately set the thickness of each material so as to allow detection of radiation with a sufficient sensitivity in accordance with type of radiation and also to sufficiently secure the physical protection of the light tight layer.

Figure 2:
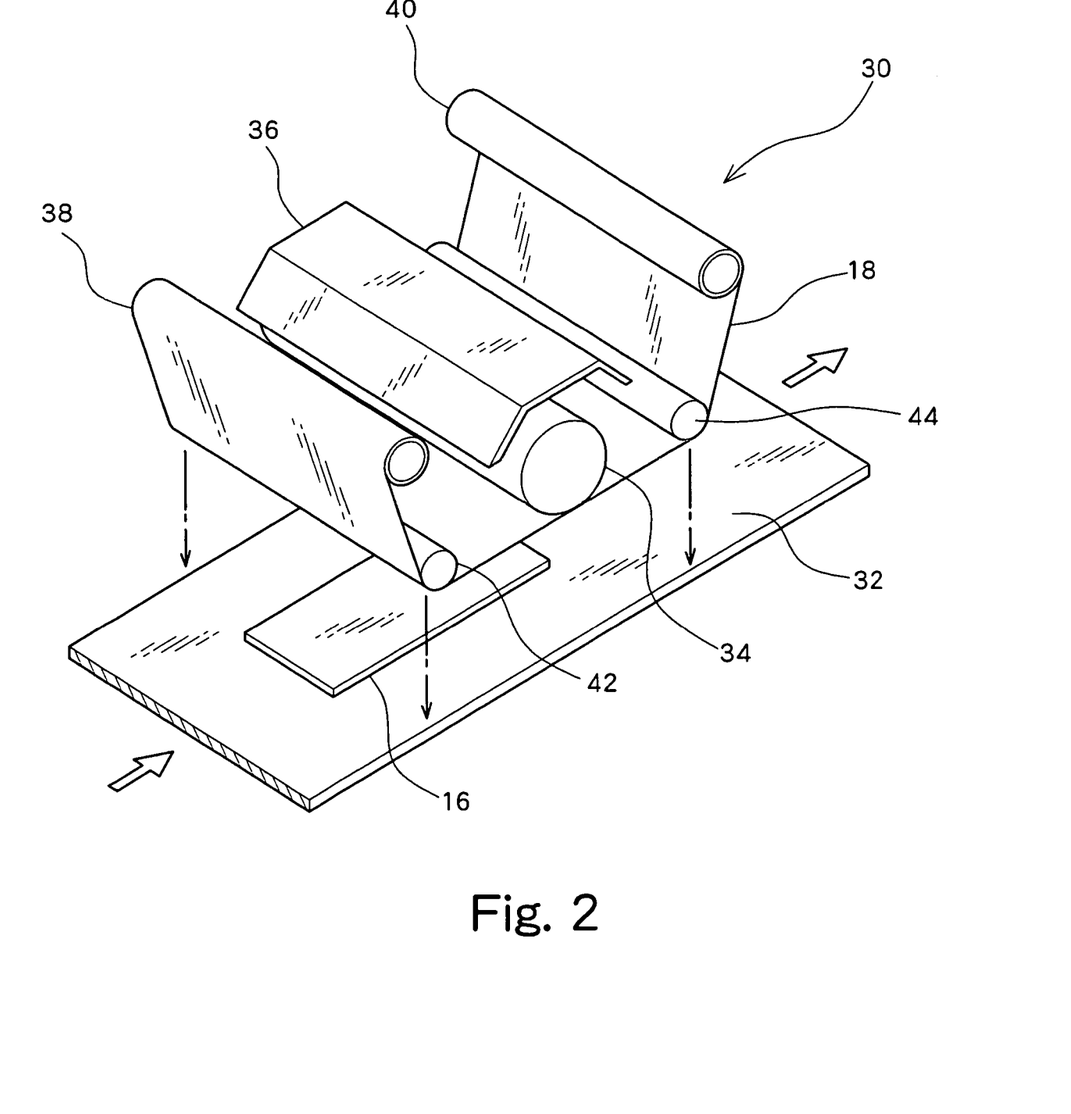
FIG. 2 is a perspective view showing a structure of a thermal transfer device.

FIG. 2 illustrates a thermal transfer device 30. The scintillator plate 16 is placed on a belt conveyer 32 and is transported with the movement of the belt conveyer 32 in the direction shown in the arrow in FIG. 2. A transfer unit, which includes a feed roller 38, a take-up roller 40, a heater 36, a thermal transfer roller 34, and guidance rollers 42 and 44, and so on, is provided above the belt conveyer 32.

The thermal transfer sheet 18 is wrapped around the feed roller 38. The thermal transfer sheet 18 which is supplied from the feed roller 38 is guided by the guidance roller 42, passes the thermal transfer roller 34 and is turned by the guidance roller 44, and is then taken up by the take-up roller 40. The thermal transfer roller 34 is heated by the heater 36 at a predetermined temperature, and presses the thermal transfer sheet 18 onto the scintillator plate 16 passing under the thermal transfer roller 34. As such, heat and pressure is applied simultaneously onto the scintillator plate 16 at a portion where the thermal transfer roller 34 contacts. The belt conveyer 32 is being transported at a fixed speed, and the thermal transfer sheet 18 is also being transported at the same fixed speed. While the thermal transfer sheet 18 which has been heated is turned by the guidance roller 44, at this time, separation of the base film 20 and the film 14 in the thermal transfer sheet 18 is achieved due to the effect of the guidance roller 44 as shown in FIG. 1. Specifically, the film 14 is stripped off the base film 20.

Accordingly, with the use of the thermal transfer device 30 as shown in FIG. 2, a film formation process can be performed easily and rapidly with respect to the scintillator plate 16 which may have various shapes and sizes, thereby allowing significant reduction in the manufacturing cost. This structure also provides an advantage that the film formation process can be performed in various locations. By aligning a plurality of scintillator plates 16 on the belt conveyer 32, the thermal transfer process can be performed successively with respect to these scintillator plates 16. Therefore, the structure shown in FIG. 2 is also advantageous in that mass processing can be performed easily. Here, while the heating temperature at the time of thermal transfer is 100 to 250° C., for example, the heating temperature may be appropriately set in accordance with the thermal transfer sheet and the scintillator material and the like. As the portion to which heat is applied is limited in both the transporting direction and the depth direction of the scintillator plate and also heating is performed only instantaneously, the thermal influence on the scintillator material can be substantially disregarded.

Figure 3:
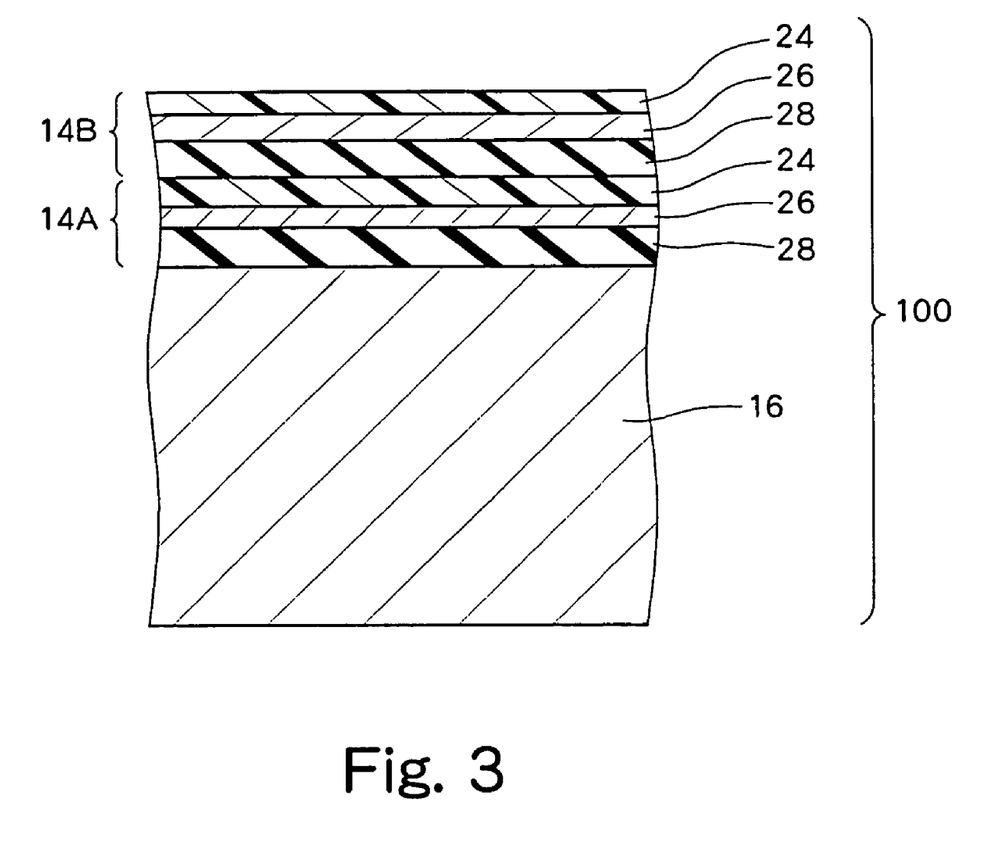
FIG. 3 is a view showing a scintillator member having a plurality of films.

FIG. 3 shows a scintillator member 100 in which a plurality of films are layered. Referring to FIG. 3, two films 14A and 14B are provided on the scintillator plate 16. Each of the films 14A and 14B includes, as viewed from the radiation entering side, the protective layer 24, the aluminum layer 26, and the adhesive layer 28. By repeating the process as described with respect to FIG. 2 twice, the two-layer structure including films 14A and 14B can be formed easily. Of course, it is similarly easy to form a layered structure including three or more films.

In the thermal transfer process shown in FIG. 2, it is desirable to sufficiently remove foreign matter such as dust and waste existing on the surface of the scintillator plate 16 prior to the thermal transfer process. Namely, it is desirable to clean the surface of the scintillator plate 16. In this case, cleaning methods such as air blowing or washing can be used. In some cases, it is also possible to prepare a clean space or an equivalent room and perform the thermal transfer process in such a space, in order to prevent contaminants from entering. Clean air which has passed through an air filter is introduced into such a sealed space. An air blower is a device which sprays clean air onto the scintillator plate 16 to blow foreign matter off the surface prior to the thermal transfer. This process has an advantage that generation of pin holes caused by foreign matter can be effectively prevented.

In addition to the thermal transfer method described above, it is also possible to adopt a pressure transfer method. In this case, a pressure sensitive sheet is used. The pressure sensitive sheet, similar to the thermal transfer sheet described above, includes a film (having a protective layer, a deposition layer, and an adhesive layer) on a base sheet. The adhesive layer in the pressure sensitive sheet is formed of an adhesive material which sufficiently exerts an adhesion effect when pressure is applied, and is not formed of a thermoplastic adhesive material. In the pressure sensitive transfer method, the pressure sensitive transfer sheet is pressed onto the scintillator plate by the pressure roller, and thus the film (a release film) is transferred onto the scintillator plate. This pressure transfer method can provide advantages similar to those of the thermal transfer method. More specifically, because the film is formed on the base film prior to the transfer, it is possible to form the film to have a small thickness. In addition, physical or structural protection and enforcement of the film can be achieved to a greater degree than when the film exists solely. After the transfer, as the film is transferred to the scintillator plate, the film can be protected and enforced physically or structurally. Generation of thermal distortion can be prevented by using the pressure transfer method, whereas transfer of a thinner film can be achieved by using the thermal transfer method.

Figure 4:
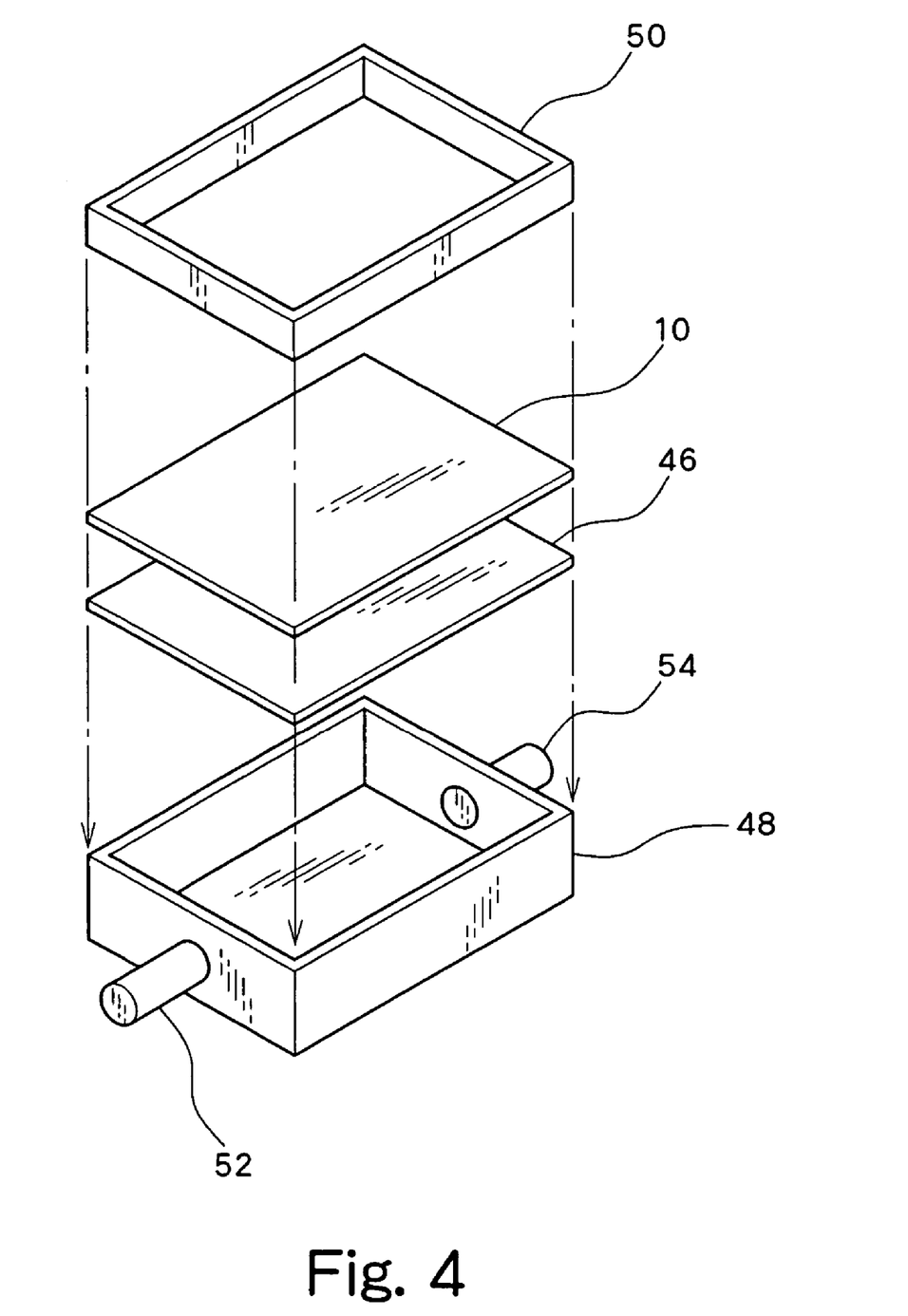
FIG. 4 is a conceptual view of a radiation measuring device according to an embodiment of the present invention.

FIG. 4 is an exploded perspective view which conceptually shows a radiation measuring device having the scintillator member 10 described above. A transparent reinforcing plate 46 which is formed of an acryl plate or the like is provided on the rear surface side of the scintillator member 10, and these member are mounted in a container 48. The container 48 forms a so-called dark room, and in the example shown in FIG. 4, light receiving surfaces of two photomultiplier tubes (PMTs) 52 and 54 are exposed in the interior space of the container 48.

Radiation entering from outside passes through the film in the scintillator member 10 and reaches the scintillator plate, where light is emitted. The emitted light then passes through the reinforcing plate 46 and reaches the interior space of the container 48, where the light is detected by the two photomultiplier tubes 52 and 54. Due to the light shielding effect achieved by the film which is formed on the scintillator member 10 for the purpose of physical protection, entering of external light can be effectively prevented. In particular, even when any member comes into contact with the surface of the scintillator member 10 through an opening portion of a frame body 50, the light tight layer, i.e. the aluminum layer, of the scintillator member 10 can be protected by the above-described film. Specifically, the aluminum layer is sandwiched between the protective layer and the scintillator plate, and also the scintillator plate functions as a rear surface support substrate with respect to the protective layer (and also with respect to the aluminum layer). Accordingly, even when local stress is applied onto the protective layer or the aluminum layer, such a stress can be dispersed by the rear surface support substrate, as a result of which physical strength of the film can be enhanced.

Figure 5:
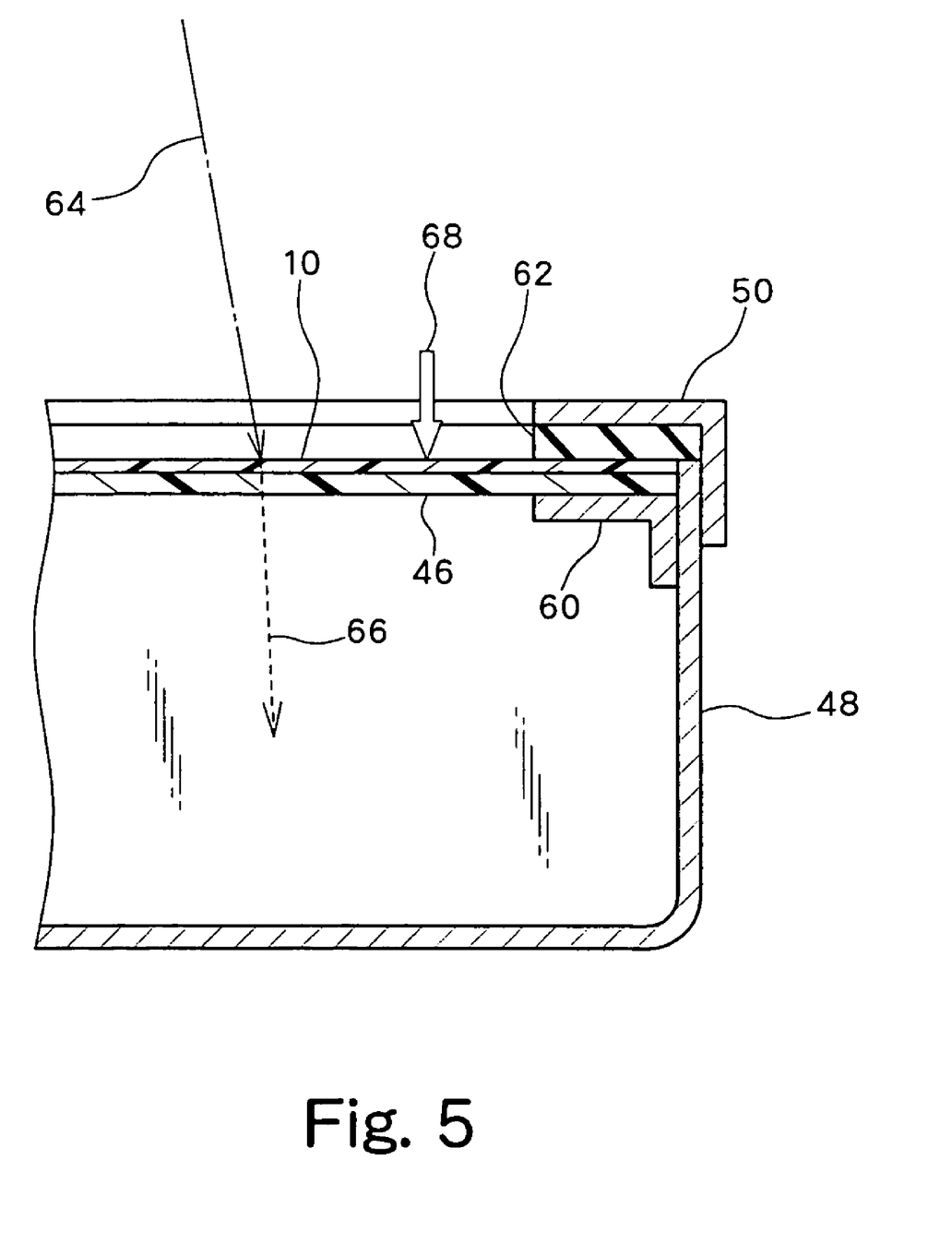
FIG. 5 is a partial cross sectional view of a radiation measuring device according to the embodiment of the present invention.

FIG. 5 shows a partial cross sectional view of the radiation measuring device shown in FIG. 4. The composite member formed by the scintillator member 10 and the reinforcing plate 46 is supported by a frame 60 attached on the container 48. By pressing the composite member against the frame 60 via a packing 62 by the frame body 50, a gap is completely closed by the effect of the packing 62, thereby effectively preventing external light from entering through the gap. The packing 62 has an annular shape for surrounding the whole periphery of the composite member. Numeral 64 represents radiation. Radiation externally entering reaches and excites the scintillator member 10, thereby causing the scintillator member 10 to emit light, as indicated by numeral 66. Numeral 68 represents a physical effect. According to the present embodiment, even when such a physical effect is applied onto the scintillator member 10 via the opening portion of the frame body 50, the aluminum layer functioning as a light tight layer of the scintillator member 10 can be effectively protected because the film is formed on the surface of the scintillator member 10.

Figure 6:
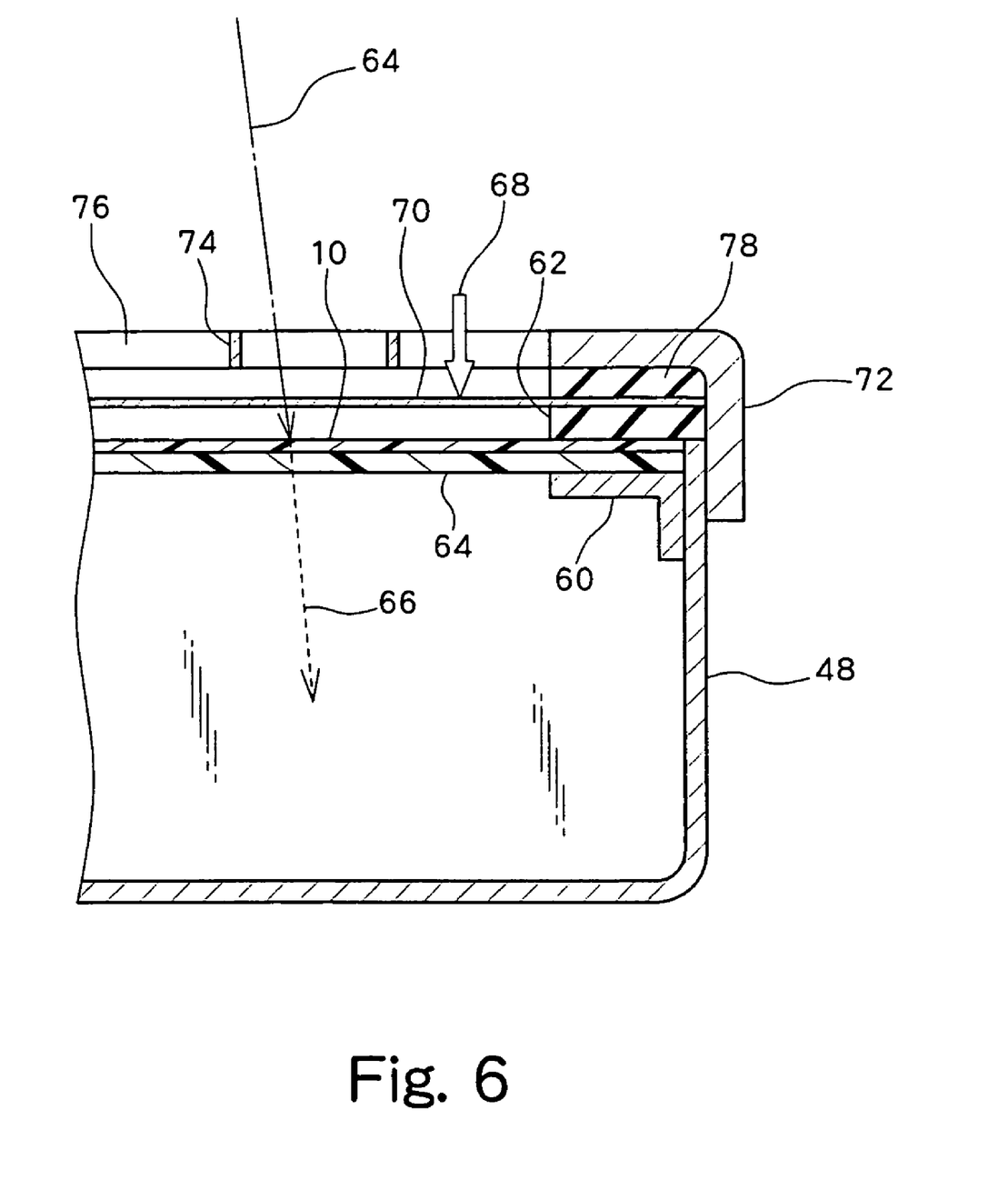
FIG. 6 is a partial cross sectional of a radiation measuring device according to another embodiment of the present invention.

FIG. 6 shows a partial cross sectional view of a radiation measuring device according to another embodiment of the present invention. The fundamental structure of the device shown in FIG. 6 is the same as the embodiment shown in FIG. 5; a composite member formed by the scintillator member 10 and the reinforcing plate 46 is supported by the frame 60 mounted on the container 48. In the embodiment shown in FIG. 6, however, a light tight film 70 as conventionally used is separately provided. In addition, a lattice 74 is provided in an opening portion 76 of a frame body 72 so as to maximize prevention of any member from entering. With the simultaneous use of protection by means of the conventional method and protection by means of the film according to the present embodiment, a more robust radiation measuring device can be achieved. Further, by closing a gap between members with elastic packing denoted by numerals 62 and 78, it is possible to efficiently prevent external light from entering the container 48.

The radiation measuring devices shown in FIGS. 4 to 6 can be used in a surface contamination detector for checking contamination caused by radioactive materials existing on the floor or walls in a radiation handling facility, or in a body surface monitor for checking contamination caused by radioactive materials on the body surface, for example. The scintillator member according to the above embodiments of the present invention can be applied to various usages, which are not limited to those described in the specification of the present application.

While the preferred embodiments of the present invention have been described using specific terms, such description is for illustrative purposes only, and it is to be understood that changes and variations may be made without departing from the spirit or scope of the appended claims.

What is claimed is:

1. A scintillator member comprising:
a scintillator which emits light when radiation enters the scintillator; and
at least one film formed on a surface side of the scintillator which serves as a radiation entering surface side, wherein
the film includes a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator,
the film is a strip film which has been transferred from a transfer sheet onto the surface of the scintillator, and
the transfer sheet is a thermal transfer sheet, and the film has been formed by using a thermal transfer method.

2. A scintillator member according to claim 1, wherein the light tight layer is a deposition layer containing aluminum.

3. A scintillator member according to claim 1, wherein the protective layer is a colored layer having a light shielding effect.

4. A scintillator member comprising:
a scintillator which emits light when radiation enters the scintillator; and
at least one film formed on a surface side of the scintillator which serves as a radiation entering surface side, wherein
the film includes a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator,
the film is a strip film which has been transferred from a transfer sheet onto the surface of the scintillator,
a plurality of films are layered on the surface side of the scintillator, and
each film includes the protective layer, the light tight layer, and the adhesive layer.

5. A scintillator member comprising:
a scintillator which emits light when radiation enters the scintillator; and
at least one film formed on a surface side of the scintillator which serves as a radiation entering surface side, wherein
the film includes a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator,
the film is a strip film which has been transferred from a transfer sheet onto the surface of the scintillator, and
the radiation is a β ray.

6. A scintillator member according to claim 5, wherein a reflective material which reflects light entering from a rear surface side of the film is included in the adhesive layer.

7. A radiation measuring device comprising:
a scintillator member;
a container which encloses a rear surface side of the scintillator member; and
a light detector for detecting light emitted from the rear surface side of the scintillator member, wherein
the scintillator member includes:
a scintillator which emits light when radiation enters the scintillator; and
at least one film formed on a surface side of the scintillator which serves as a radiation entering surface side,
the film including a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator, and wherein
the film is a strip film which has been transferred from a transfer sheet onto the surface of the scintillator, and
the radiation is a β ray.

8. A radiation measuring device comprising:
a scintillator member;
a container which encloses a rear surface side of the scintillator member; and
a light detector for detecting light emitted from the rear surface side of the scintillator member, wherein
the scintillator member includes:
a scintillator which emits light when radiation enters the scintillator; and
at least one film formed on a surface side of the scintillator which serves as a radiation entering surface side,
the film including a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator, and wherein
the film is a strip film which has been transferred from a transfer sheet onto the surface of the scintillator, and
a reinforcing member having transparency is provided on a rear surface side of the scintillator member.

9. A radiation measuring device comprising:
a scintillator member;
a container which encloses a rear surface side of the scintillator member; and
a light detector for detecting light emitted from the rear surface side of the scintillator member, wherein
the scintillator member includes:

a scintillator which emits light when radiation enters the scintillator; and at least one film formed on a surface side of the scintillator which serves as a radiation entering surface side, the film including a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator, and wherein the film is a strip film which has been transferred from a transfer sheet onto the surface of the scintillator, and a plurality of films are layered on a top surface side of the scintillator member, and each of the films includes the protective layer, the light tight layer, and the adhesive layer.

10. A radiation measuring device comprising:

a scintillator member;

a container which encloses a rear surface side of the scintillator member; and a light detector for detecting light emitted from the rear surface side of the scintillator member, wherein the scintillator member includes:

a scintillator which emits light when radiation enters the scintillator; and at least one film formed on a surface side of the scintillator which serves as a radiation entering surface side, the film including a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator, and wherein the film is a strip film which has been transferred from a transfer sheet onto the surface of the scintillator, and at least one separate light tight film is provided on a top surface side of the scintillator member in such a manner that the separate light tight film is spaced from the scintillator member.

11. A radiation measuring device comprising:

a scintillator member;

a container which encloses a rear surface side of the scintillator member; and a light detector for detecting light emitted from the rear surface side of the scintillator member, wherein the scintillator member includes:

a scintillator which emits light when radiation enters the scintillator; and at least one film formed on a surface side of the scintillator which serves as a radiation entering surface side, the film including a protective layer which transmits the radiation therethrough, a light tight layer which is formed on a rear surface side of the protective layer, transmits the radiation, and prevents transmission of light, and an adhesive layer which is provided on a rear surface side of the light tight layer for adhering the film onto the scintillator, and wherein the film is a strip film which has been transferred from a transfer sheet onto the surface of the scintillator, and the top surface side of the scintillator member is covered with a protective grille having a plurality of openings.

12. A method of manufacturing a scintillator member using a transfer sheet including a base layer and a film, comprising:

at least one transfer step of transferring the film from the transfer sheet onto a scintillator plate, wherein the transfer step includes a step of applying heat or pressure onto the transfer sheet while the transfer sheet is being superimposed on the scintillator plate to thereby separate the film from the transfer sheet and adhere the film onto the scintillator plate, the film includes a light tight layer which transmits radiation therethrough and also prevents transmission of light, and the radiation is a β ray.

13. A method of manufacturing a scintillator member according to claim 12, wherein the transfer step includes a step of cleaning a surface of the scintillator plate prior to adhering of the film onto the scintillator plate.

14. A method of manufacturing a scintillator member according to claim 12, wherein the transfer sheet is a thermal transfer sheet and the transfer step is a thermal transfer method; and during the transfer step, a support plate is provided on a rear surface side of the scintillator plate.

15. A method of manufacturing a scintillator member using a transfer sheet including a base layer and a film, comprising:

at least one transfer step of transferring the film from the transfer sheet onto a scintillator plate, wherein the transfer step includes a step of applying heat or pressure onto the transfer sheet while the transfer sheet is being superimposed on the scintillator plate to thereby separate the film from the transfer sheet and adhere the film onto the scintillator plate, the film includes a light tight layer which transmits radiation therethrough and also prevents transmission of light, and the transfer step is performed at least twice, for layering a plurality of films on the scintillator plate.

* * * * *